United States Patent [19]

Bezy et al.

[11] Patent Number: 5,703,344

[45] Date of Patent: Dec. 30, 1997

[54] ELECTRONIC FUNDS CONFIRMATION AT POINT OF TRANSACTION

[75] Inventors: E. William Bezy, San Rafael; William Chenevich, Hillsborough, both of Calif.

[73] Assignee: Visa International Service Association, Foster City, Calif.

[21] Appl. No.: 497,195

[22] Filed: Jun. 30, 1995

[51] Int. Cl.$^6$ .................. G06K 5/00; G06F 17/60
[52] U.S. Cl. .................. 235/379; 235/380
[58] Field of Search .................. 235/379, 380; 364/406, 408; 902/22, 40; 340/825.33, 825.31; 380/24

[56] References Cited

U.S. PATENT DOCUMENTS

| | | | |
|---|---|---|---|
| 3,852,571 | 12/1974 | Hall et al. | 235/379 |
| 4,672,377 | 6/1987 | Murphy et al. | 235/375 X |
| 4,810,866 | 3/1989 | Lord, Jr. | 235/379 |
| 5,053,607 | 10/1991 | Carlson et al. | 235/379 |
| 5,175,682 | 12/1992 | Higashiyama et al. | 235/379 X |
| 5,231,569 | 7/1993 | Myatt et al. | 364/408 |
| 5,237,620 | 8/1993 | Deaton et al. | 235/380 X |
| 5,256,863 | 10/1993 | Ferguson et al. | 235/383 |
| 5,426,281 | 6/1995 | Abecassis | 235/379 |
| 5,465,206 | 11/1995 | Hilt et al. | 364/406 |
| 5,594,226 | 1/1997 | Steger | 235/379 |

*Primary Examiner*—Donald T. Hajec
*Assistant Examiner*—Thien Minh Le

[57] ABSTRACT

A real-time point of transaction funds confirmation system is provided whereby a draft is presented by a payor to a payee and a bank identifier and an account identifier are electronically read off the draft and used as part of a funds confirmation request. The funds confirmation request is submitted to a network where a plurality of payees and a plurality of payor banks are connected. The payor bank identified on the draft verifies the account identifier and compares the amount of the transaction to an amount of funds available in the account corresponding to the account identifier. The payor bank processor then returns a response message indicating whether or not sufficient funds were available. If the request is a funds guarantee request, then the payor bank will generally place a halt on funds sufficient to cover the draft. Otherwise, if the request is merely a funds verification request, the payor bank may choose not to place a hold on the funds.

10 Claims, 3 Drawing Sheets

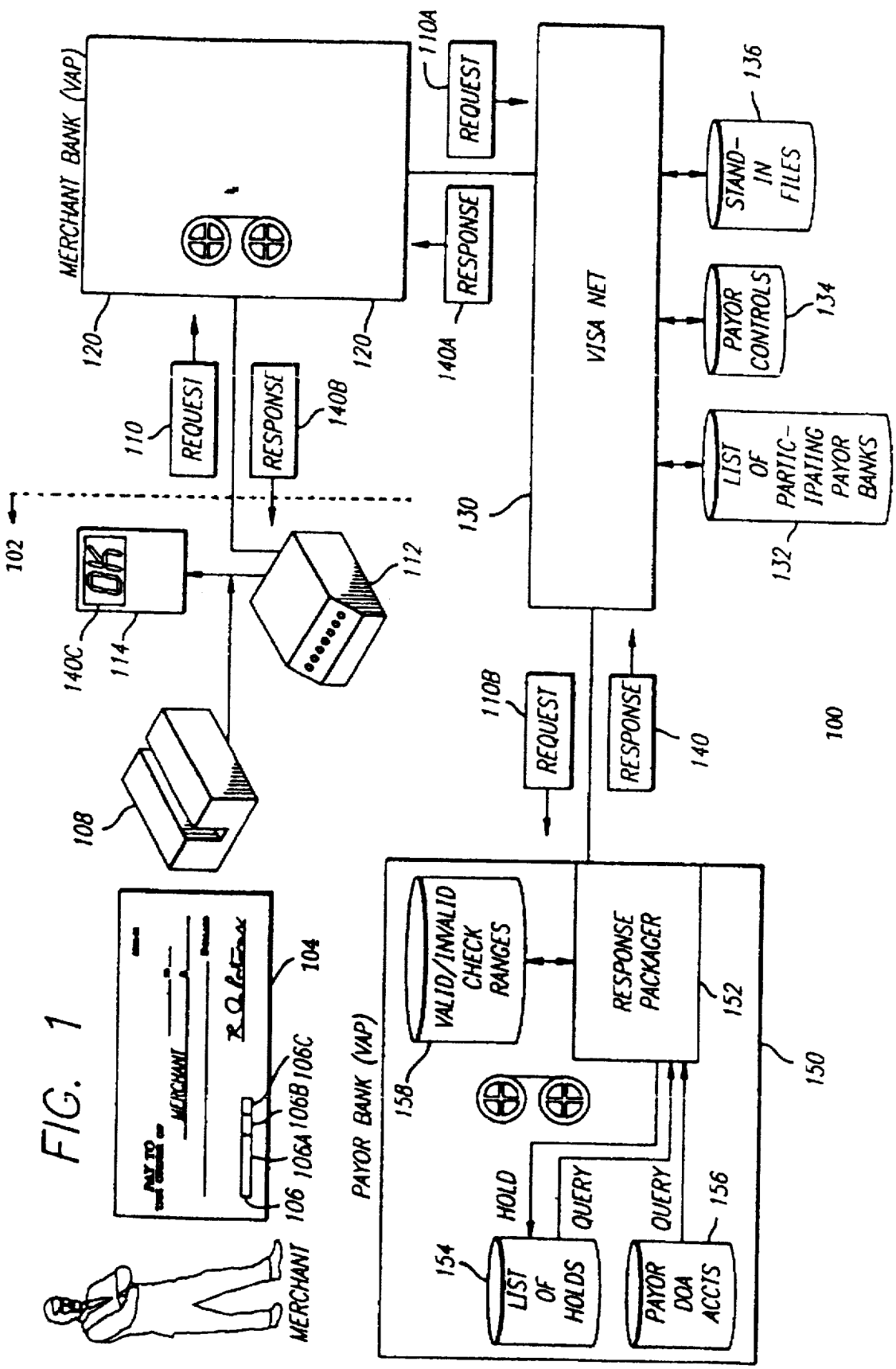

ELECTRONIC FUNDS CONFIRMATION AT POINT OF TRANSACTION

BACKGROUND OF THE INVENTION

The present invention relates to electronic funds handling, more particularly to real-time verification of funds at the point of transaction.

Merchants (and other payees) have long been concerned about accepting drafts (checks or check-like instruments) in exchange for goods or services where the control over the goods or services passes to the presenter of the draft (the payor) and the draft is not converted to known good funds before control is lost, i.e., before the transaction is completed. Cash and credit card payments do not present the same problems. Cash is good funds and credit card payments are good funds from the merchant's point of view if the proper procedures are followed by the merchant.

Many systems have been developed that provide a merchant some assurance that the payor is not a high risk or that minimize the risk of the draft not being honored, but each of these prior art systems provide only an approximation to having good funds. In the former case, the merchant could only expect to get an approximate evaluation of the payors propensity to write invalid drafts. In the latter case, the merchant reduced the risk by pooling risk with other merchants or purchasing insurance. While insurance will even out the risk, it does not reduce the risk or incidence of bad drafts, but only makes it a constant, and hopefully, small amount for each merchant.

A draft can be dishonored for a number of reasons. A draft represents an obligation of the payor bank (or other financial institution) to pay good funds (readily negotiable and secure money) to the payee upon presentation of the draft to the payor bank. The payor bank obtains those funds from the payor's account on which the draft is drawn. Typically, but not always, the payor's account is a demand deposit account (DDA), but it might be an investment account, savings account, credit line account, or the like. In any case, the merchant has the same need to know that the funds are available.

If the payor account is closed, the draft is known to be stolen or fraudulent, a "stop pay" has been issued or the payor account does not contain sufficient funds or in a number of other circumstances, the draft will not be honored (i.e., the payor bank will refuse to exchange the draft for good funds) and the merchant is left to attempt collection from the payor. Each year, $5 billion is lost by merchants in the United States alone due to uncollectible drafts. Of this, 41% of the losses were due to closed accounts or fraudulent presentation (a draft was presented to the merchant by a payee other than the account holder) and 55% of the losses were due to non-sufficient funds (NSF) and other reasons.

One method merchants have used to avoid accepting a draft from a closed account is to compare a bank identifier and account identifier found on the draft against a negative file maintained by a negative file service. The negative file contains listing of accounts which are known to the negative file service as being closed accounts. The negative file might also include indications of accounts which are known to have generated NSF rejections in the past. The data in the negative file database is typically generated by the third parties in cooperation with all of the service's subscribing payees. Some large chains operate their own internal negative file systems, possibly in combination with consumer spending habit tracking systems. While the use of negative file service does not prevent the passing of an invalid or uncollectible draft, it does reduce the risk somewhat that a merchant will accept a bad draft.

Some merchants prefer to eliminate the risk of bad instruments entirely through the use of a check guarantee service. A check guarantee services operates as follows. If the merchant conforms to rules set out by the check guarantee service company and the draft subsequently turns out to be uncollectible, the check guarantee service will provide good funds in that amount to the merchant. While this does eliminate the risk for each individual draft, it does not eliminate the overall cost of bad instruments, but merely spreads the losses over many merchants.

To avoid the risk, the payee needs to have some indication of whether or not the funds will be collectible and that indication must be provided at the point of transaction before the payee relinquishes control over the services or goods. Therefore, what is needed is a mechanism which would allow a merchant, in real-time and prior to releasing control of provided services and goods, to verify that the account on which a draft is drawn and presented to the payee is both a valid account and contains sufficient funds to cover the amount of the draft. While a merchant could perform this operation manually, the merchant would have to know the telephone number of the payor bank and the payor bank would have to agree to provide such information via telephone. The merchant would also have to limit themselves to transactions during the business hours or operating hours of the payor bank.

Such manual system would be impractical where the transaction must be completed in a short amount of time, such as when the transaction is a purchase of groceries at a busy grocery store. To reduce the delay, some grocery stores implement in-house systems for check verification; however, the rejections from such a system are only based on prior bad instruments presented to that particular store or chain.

SUMMARY OF THE INVENTION

An improved funds confirmation system is provided by virtue of the present invention. In one embodiment, a real-time point of transaction funds confirmation system is provided whereby a draft presented by a payor to a payee is confirmed against the account on which the draft is drawn, using a bank identifier and an account identifier electronically read from the draft. A confirmation request record is submitted to a network where a plurality of payees (directly or via payee banks) and a plurality of payor banks are connected. As used herein, a bank is not limited to the legal definition of a bank, but is used to mean any financial institution which pays funds from a payor account upon a presentation of a draft instrument. The confirmation request record is submitted to the payor bank through the network. The payor bank verifies the account identifier and compares the amount of the transaction to an amount of funds available in the account corresponding to the account identifier. The payor bank processor then returns a response record indicating whether or not sufficient funds were available. If the record type is a funds guarantee record type, then the payor bank will generally place a hold on funds sufficient to cover the draft. Otherwise, if the record type is a funds verification record type, the payor bank only verifies that the funds are available at the time of the transaction and not necessarily at the time of presentation.

In one embodiment of the funds confirmation system, the payor bank identifier and the account identifier are encoded in magnetic-ink, computer-readable (MICR) print on the draft. Herein, a check is used as an example of a draft or instrument. However, it should be understood that other instruments are possible.

A further understanding of the nature and advantages of the inventions herein may be realized by reference to the remaining portions of the specification and the attached drawings.

BRIEF DESCRIPTION OF THE DRAWINGS

FIG. 1 is a block diagram of a real-time point of transaction funds confirmation system.

DESCRIPTION OF THE PREFERRED EMBODIMENT

Figure 2A:
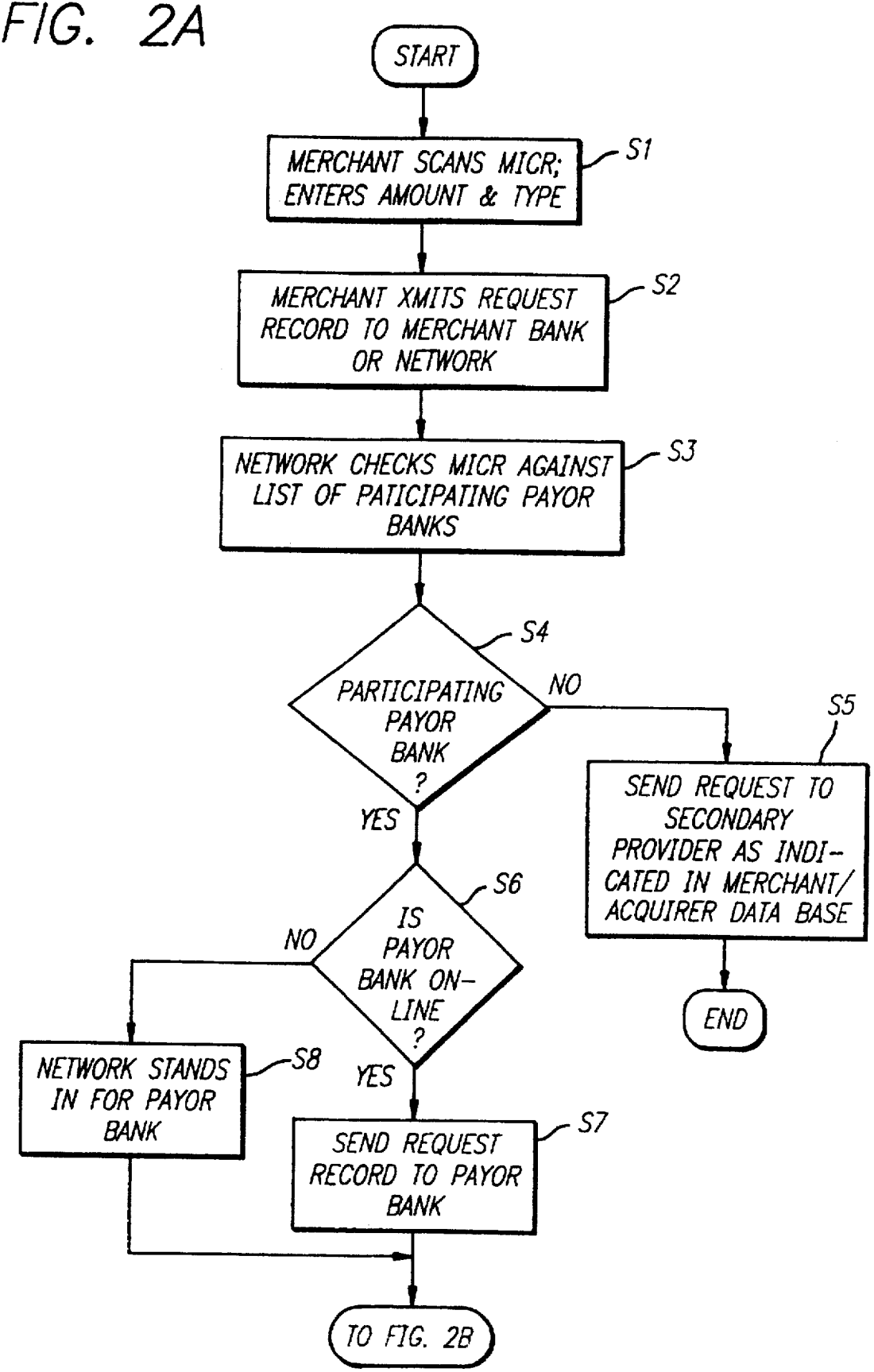
FIGS. 2A-B is a flow-chart of a process of performing funds confirmation according to the present invention.

The following detailed description describes a merchant accepting a draft from a consumer drawn on a demand deposit account at a bank (payor bank) and the merchant submitting the draft to a merchant bank for eventual clearance with payor bank. These specific elements are used for example and it should be apparent that substitutions can be made without affecting the essence of this description. For example, the merchant can be replaced with any payee and the consumer with any payor who presents a draft to the payee. The draft need not be a draft on a demand deposit account, but can be any type of draft which the payee desires to have verified or guaranteed. The banks (payor/merchant bank, payee/consumer bank) also can be replaced with any manner of financial institution. Furthermore, the merchant bank is not required in this system, as a merchant could well deliver the draft to the payor bank directly for conversion to good funds. Good funds are cash or other indication of value which the payee has a reasonable expectation of being negotiable or convertible to cash, such as a deposit into an account controlled by the payee and maintained by a solvent or insured financial institution.

FIG. 1 is a block diagram showing various elements used in one embodiment 100 of a funds confirmation system according to the present invention. In this system, a merchant is presented with a draft 104 at a point of transaction 102 and the merchant desires to have the draft confirmed at the time and place of the transaction. The face of the draft specifies an amount of the draft, the payor bank and the account at that payor bank on which the draft is drawn. In most cases, the draft also specifies a serial number of the draft (e.g., a check number). A bank number and the account number are printed on the face of the draft in a machine readable format (106A and 106B, respectively), typically in magnetic ink, in a coding zone 106, usually in the form of a line of magnetic ink computer readable digits and punctuation (a "MICR line"). If the serial number is present, it is also typically included in the coding zone (106C).

Two types of confirmation queries (requests) are discussed below, a verification request and a guarantee request. In a verification request, the existence of the account and the bank indicated by the draft is checked and the sufficiency of funds at the payor bank is checked. In a guarantee request, the same checks are performed as with the verification request, but in addition, the payor bank takes liability for payment of the draft if the payor bank returns a favorable response. The prudent payor bank will consequently place a hold in real-time on the funds necessary to cover the draft if the request is a guarantee request.

The hold could be a traditional type of hold, where the funds are no longer available for withdrawal, or could be merely a constructive hold. A constructive hold is used by the payor bank where other means are available to secure the funds. Because the payor bank becomes obligated to accept the draft at a later time of presentation in exchange for good funds (the point of clearing) regardless of funds availability, a prudent payor bank will place a hold on the funds so that the payor account cannot be emptied or closed between the time the payor bank approves the funds guarantee request and the time the draft is presented for payment in good funds. However, if the payor bank has other means of collecting the funds from the payor, such as a collateral account, actual collateral, or a credit line, the payor bank might use these as a constructive hold on funds.

The funds confirmation system comprises a MICR line reader 108, which generates a request record 110 for transmission over telephone lines using modem 112. Of course, other electronic connections to point of transaction 102 are also possible, such as a leased line, a computer link, a TCP/IP (Transport Control Protocol/Internet Protocol) connection, etc. Point of transaction 102 is coupled, via the connection to merchant bank transaction processor (TP) 120. Merchant bank TP 120 is coupled to a network 130, which is in turn coupled to a payor bank TP 150. In a preferred embodiment, network 130 is the VisaNet currently operated by Visa International Service Association and the TP's include a Visa Access Point (VAP) processor. Request record 110 might be reformulated at different stages of the system, such as record 110A between merchant bank TP 120 and network 130, and request record 110B between network 130 and payor bank TP 150.

The system also includes mechanisms to return a response record 140 to the point of transaction in real-time, and this response record might be reformulated as response record 140A between network 130 and merchant bank TP 120, response record 140B between merchant bank TP 120 and point of transaction 102, and response display 140C displayed on merchant console 114 (a list of some possible responses is shown in Table 1). Where a payor bank TP 150 is not configured to return a response record 140 in real-time response to a request record 110B, network 130 includes means for preforming a "stand-in" function for payor bank TP 150, using stand-in files 136. These stand-in files 136 might contain a list of the current balances for current accounts maintained by the payor bank. Network 130 is also coupled to a database 132 listing the participating payor banks, including references to the bank identifier used in coding zone 106A and a database of payor controls 134.

The real-time response at payor bank TP 150 is generated by a response packager 152 in the form of response record 140. Response packager reads the fields in request record 110B and initiates several operations, discussed in further detail in connection with the flowchart of FIG. 2, before sending response record 140. Response record 140 could return one of several responses to merchant bank TP 120, such as those shown in Table 1.

TABLE 1

Response Messages

Transaction Approved
Account Not Valid at This Payor Bank
Account Closed
Serial Number Not Valid
Serial Number Indicated as Lost or Stolen
Insufficient Funds Since network 130 uses the bank identifier to route request record 110 to the proper payor bank, response packager 152 should not encounter a request with an improper bank identifier, but response packager 152 could be configured to check the bank identifier field of request record 110B if the field is supplied by network 130. Where a non-participating bank is identified by the bank identifier, network 130 request to a secondary (negative file) service chosen by the merchant and indicated in the merchant/acquirer set-up file.

Response packager 152 uses a holds database 154 and an account database 156 to decide what the real-time response will be. The holds database includes a list of all the prior holds placed on the account. A hold is removed when a draft corresponding to the hold is presented for clearing. The correspondence of a draft to an earlier confirmation request is determined using the serial number of the draft. Alternatively, holds are removed (and guarantees are retracted) after a specified number of days.

Response packager 152 optionally compares the account identifier and the serial number against a serial number database 158. Serial number database 158 maintains a list of which serial numbers are valid or invalid for which accounts. More typically, serial number database 158 indicates invalid draft number ranges. Where drafts within a known range of serial numbers are lost or stolen, and the account holder reports this to the payor bank, that range of numbers is stored in database 158, and response packager 152 will send a negative response record if a request is sent in for one of those lost or stolen drafts. Database 158 might also contain lists of already cleared drafts, to prevent a forger from presenting a draft with a serial number matching a draft which has already been presented.

Figure 2B:
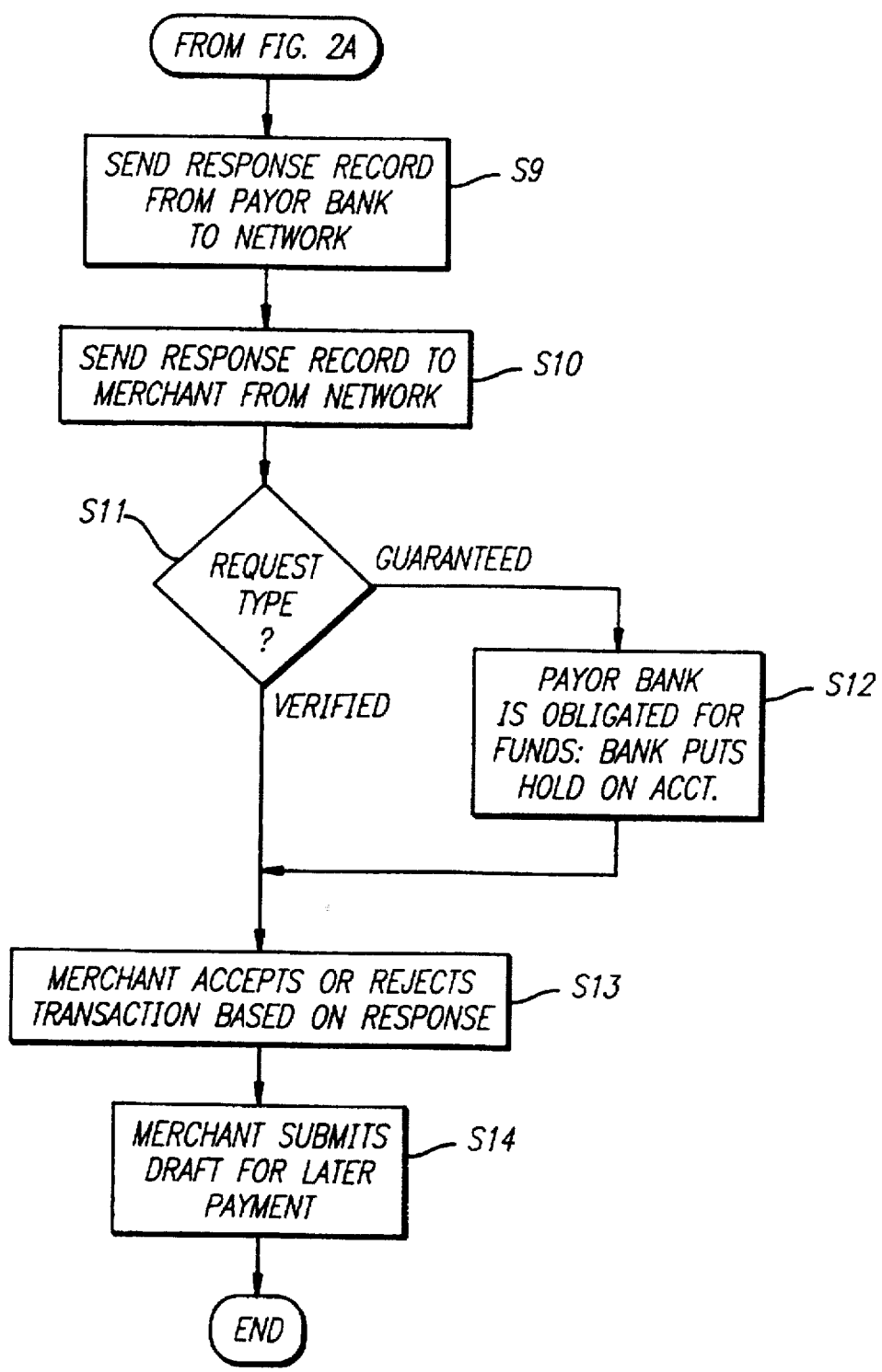

FIG. 2 is a flowchart of a process of draft processing in real-time at a point of transaction to confirm the collectibility of the good funds behind the draft, i.e., to verify that the funds are available from a valid account or to verify availability and guarantee future collectibility of the good funds. This process is initiated each time the merchant wishes to confirm funds availability. First, the merchant scans the MICR line (coding zone 106) of draft 104 using MICR line reader 108, enters the amount of draft 104 and indicates the request type: either funds verification or funds guarantee (step S1). With the appropriate coupling to a cash register, the draft amount might be automatically provided by the cash register.

Then, the merchant transmits request record 110 containing the bank identifier, account identifier and optional serial number (read from the MICR line of the draft), the amount (entered by merchant or provided by cash register) and the request type, via merchant bank TP 120 (or directly, in come cases), to network 130 (step S2). Network 130 checks the bank identifier from the request record against the list of participating bank identifiers in database 132 (step S3). If the payor bank is not a participating bank, network 130 towards the request record to a secondary provider according to the instructions in the merchant/acquirer database and the process ends (S4, S5).

If the payor bank is a participating bank, then network 130 checks to see if the payor bank is on-line and capable of returning a response record in real-time (S6). If the payor bank is on-line, network 130 sends the request record to the payor bank (S7), otherwise the network stands-in as the payor bank (S8). In some cases, the network is not authorized to stand in for the payor bank and the payor bank is unexpectedly off-line. In these cases, network 130 routes the transaction to a secondary negative file provider as indicated in the merchant/acquirer database.

In either case, if a valid response can be made, the process continues at step S9, where a response record on behalf of the payor bank is returned to the initiator of the request, either the merchant bank TP or the merchant. If the response is to the merchant bank TP, the merchant bank TP responds in real-time to the merchant (S10). If the request is a funds guarantee request, then the payor bank secures a hold on funds from the account or generates an effective hold (S11, S12). At this point, the payor bank is obligated for the funds.

Following receipt of the response record, the merchant accepts or rejects the transaction (S13), although the prudent merchant will reject a rejected transaction at this point or request other security. The message contained in the response record might be displayed to the merchant on merchant console 114, or could be electronically noted. At some point after the transaction is complete, assuming it was accepted by the merchant, the merchant submits the draft for payment (S14) having the comfort that the draft, if not guaranteed, was at least verified.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A real-time point-of-transaction funds confirmation system wherein a draft is presented to a payee by a payor for later presentation by the payee or an agent of payee to a payor financial institution in exchange for good funds, the system comprising:

an electronically-readable identification of an account on which the draft is drawn, the account being the eventual source of the good funds;

an electronically-readable identification of the payor financial institution;

reading means for reading the identification of the account and the identification of the payor financial institution from the draft and for generating a request record for verification of funds or guarantee of funds, said request record including the identification of the account, the identification of the payor financial institution, a transaction amount, and the request type;

a network coupler which couples the reading means to a transaction network, wherein the transaction network carries said request record;

a network for coupling a plurality of network couplers to a plurality of payor bank processors;

a payor bank processor which reads said request record and reads account data from an account identified by the account identifier to verify availability of funds in the amount indicated by the transaction amount when the request type indicates the request record is for verification of funds;

means for verifying availability of funds in the amount indicated by the transaction amount and for recording a hold on funds based on a payee bank funds guarantee policy when the request type indicates the request record is a funds guarantee request; and means for generating and sending a response record to the network coupler, in real-time, wherein the response record indicates whether the payor bank identifier and the account identifier are valid and whether sufficient funds to cover the transaction amount are available in the account.

2. The system of claim 1 wherein the draft is a check and the account identifier and the payor bank identifier are encoded in magnetic-ink computer readable (MICR) format.

3. The system of claim 1, wherein the network includes a means for standing in for an off-line payor bank processor.

4. A real-time point-of-transaction funds confirmation system wherein a draft is presented to a payee by a payor for later presentation by the payee or an agent of payee to a payor financial institution in exchange for good funds, the system comprising:

an electronic character reader for identifying the identification of the payor financial institution and a payor account identifier printed on the draft and generating an electronic request record for verification of funds or guarantee of funds, said request record including the identification of the payor financial institution and the payor account identifier, a request amount, and a request type;

a transaction network comprising a stand-in file and a payor control database and coupled to a plurality of payor bank processors;

said electronic character reader coupled to the transaction network, said transaction network receiving said electronic request record from said electronic character reader and relaying said electronic request record to the payor financial institution; and the payor financial institution including a serial number database, a response packager, and an account database, said serial number database and response packager coupled to said response packager, said response packager capable of verifying availability of funds in an account indicated by said electronic request record and capable of generating and sending a response record in real-time, said response record indicative of the validity of the account indicated by said electronic request record and the availability of funds in the account.

5. The system of claim 4 wherein the payor financial institution further includes a holds database coupled to said response packager, the holds database containing a list of prior holds placed on the account indicated by said electronic request record.

6. The system of claim 5 wherein said response packager is further capable of recording a hold on the account in response to a funds guarantee request.

7. The system of claim 4 further comprising a merchant bank coupling said electronic character reader to said transaction network.

8. The system of claim 7 wherein said merchant bank capable of receiving and reformulating said electronic request record for providing to said transaction network.

9. The system of claim 4 wherein said transaction network further comprises a payor banks database.

10. The system of claim 4 wherein said serial number database maintains a list of valid and invalid serial numbers for the account indicated by said electronic request record.

* * * * *